June 17, 1924.
B. DARROW
RIM
Filed March 15, 1920
1,498,518
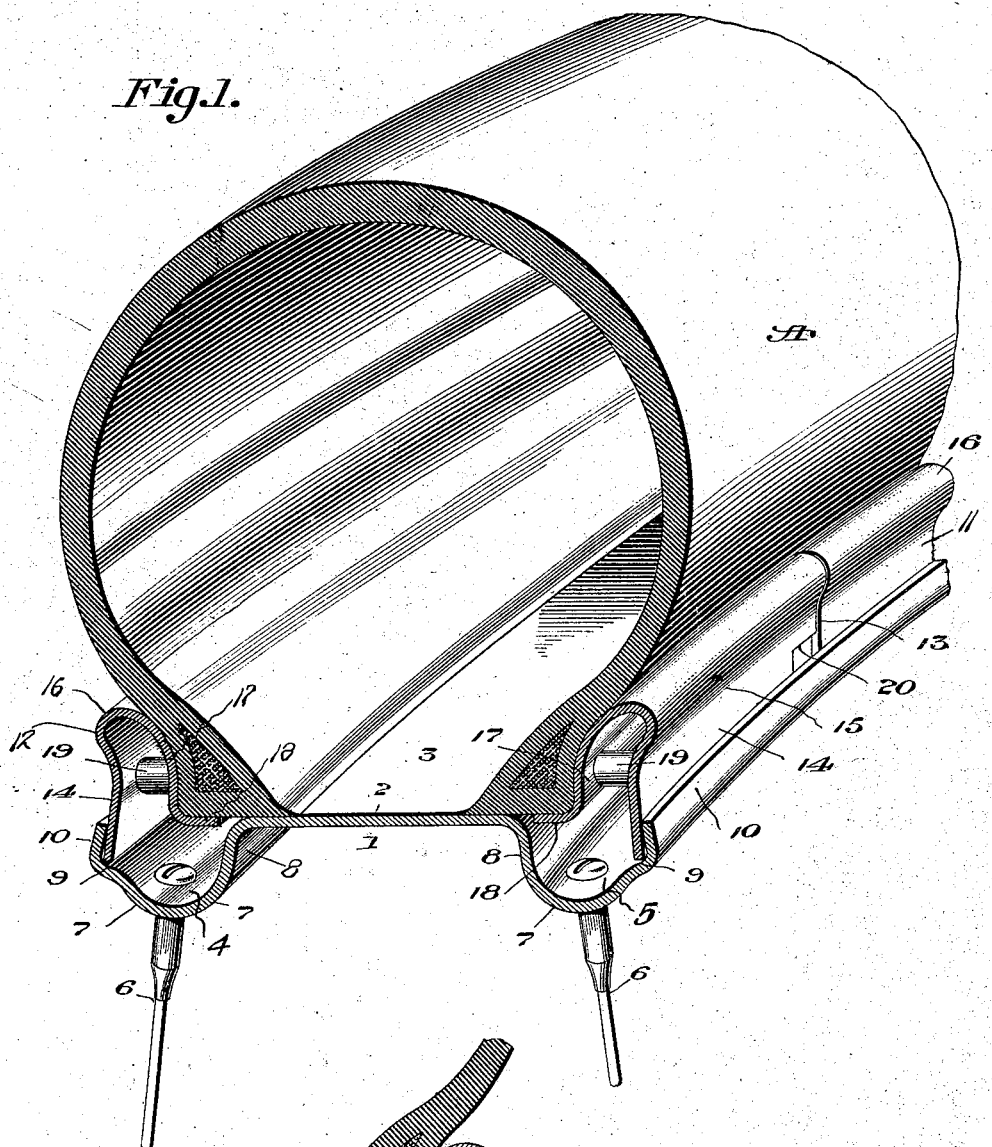
Fig.1.
Fig.2.
Inventor
Burgess Darrow
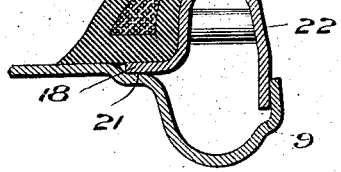
his Attorney Patented June 17, 1924.

1,498,518

UNITED STATES PATENT OFFICE.

BURGESS DARROW, OF AKRON, OHIO, ASSIGNOR TO THE GOODYEAR TIRE & RUBBER COMPANY, OF AKRON, OHIO, A CORPORATION OF OHIO.

RIM.

Application filed March 15, 1920. Serial No. 365,852.

*To all whom it may concern:*

Be it known that I, BURGESS DARROW, a citizen of the United States, and resident of Akron, Ohio, have invented new and useful Improvements in Rims, of which the following is a specification.

The present invention relates to wheel rims and more specifically to wheel rims for use in conjunction with pneumatic tires, preferably of that variety commercially known as "straight side" tires.

The invention is designed primarily to produce a rim provided with readily removable and attachable means for retaining a tire thereon, and so constructed as to possess the qualities of lightness of weight, and strength of structure, essential in the ideal rim and not to be found in wheel rims as commonly constructed.

Other objects and advantages will become readily apparent to those skilled in the art to which this invention relates when the following description is read in conjunction with the accompanying drawing, in which has been illustrated a preferred type of the invention.

Figure 1 in the drawing represents a fragmentary perspective view, partly in section of a portion of a preferred form of rim having a tire positioned thereon; and Figure 2 is an enlarged transverse fragmentary section illustrating a modified form thereof.

Referring now to the drawings, and particularly to the preferred form illustrated in Fig. 1, the numeral 1 designates the rim proper which is preferably formed of metal and provided with an annular main body portion 2 forming a tire supporting surface 3. The main body portion 2 is constructed to form annular gutters or channels 4 and 5, one of which extends entirely around each edge thereof, and to which the spokes of a wheel of any suitable construction are connected as shown at 6.

The gutters 4 and 5 project inwardly toward the center of the wheel and each gutter is formed with a portion, which in cross-section is arched as at 7 to provide principally a readily accessible chamber to the wall of which the nipples of the above mentioned spokes 6 may be attached. The arched portion 7 of each gutter 4 and 5 is connected to the rim by a substantially vertical inner wall 8 and each gutter is formed at its outer edge with a shoulder or seat 9 and a circumferential upstanding outer wall or flange 10, preferably inclined slightly from the vertical and inwardly toward the wall 8.

Means for retaining a tire designated by A upon the rim are provided in the form of resilient retaining rings 11 and 12, each of which is split transversely as shown at 13. Each retaining ring is formed preferably of a single piece of metal and shaped to form an outer substantially vertical side wall 14, curved at its outer edge to form an arched edge portion 16 projecting away from the rim. In Fig. 1 the wall 14 is shown as being slightly inwardly inclined to increase the bearing contact with the flange 10 of the rim when the tire A is inflated in use. Each ring is formed with an inner side wall 17, which is curved for the greater portion of its height in conformity with the outer side wall 14 and is provided at its inner edge with a laterally extending annular ledge or lip 18. When the ring is positioned upon the rim the lip extends towards the body portion 2 of the rim and in line with the tire supporting surface thereof.

It will be seen from Fig. 1, of the drawing that each ring 11 and 12 in its preferred form is seated within its respective gutter 4 or 5 with the inner edge of its vertical wall 14 resting upon the shoulder 9, and that the heel portion of the tire bead overhangs the edge of the body portion 2 and is supported upon the lateral ledge 18, while the toe portion of said tire bead is supported upon the surface 3 of the body portion of the rim. As illustrated in Fig. 1, the walls 14 and 17 of the rings 11 and 12 conform substantially to the shape of the outer wall of the bead portion of the tire, the inner wall 17 fitting snugly thereagainst, and the outer wall 14 being securely held against the inner side of the flange 10 of the rim by the pressure of the tire.

If desired, the walls 14 and 17 may be spaced from each other by studs 19, as shown, thus strengthening the entire ring, and preferably the outer wall of each ring is undercut as at 20 to provide for the insertion of a tool whereby when the tire is deflated and one edge thereof shoved laterally upon the rim 2, each ring may be sprung apart at its split portion 16 and readily removed from within the gutters 4 and 5.

The circumferential flanges 10 retain or hold the rings 11 and 12 against lateral movement and owing to the disposition of the annular ledges beneath the heels of the bead portions said rings are further secured or locked within the gutters 4 and 5 by the pressures both from within and upon the tire as long as the tire is inflated.

Owing to the shape of the inner walls 17 of the retaining rings 10, and the manner of supporting the bead portions, tires of various sizes and types may be mounted with equal facility upon my rim, a feature not common to rims now in use, as far as I am aware.

In the modification shown in Fig. 2, the rim is provided with an annular shouldered seat 21, and the outer wall 22 of the retaining ring is not designed to seat upon the shoulder 9, but to be held against the annular flange 10. In this instance the ledge 18 projects beneath the heel of the bead as in the preferred form, but seats upon the annular shoulder 21 of the rim.

It will thus be seen that I have provided a rim upon which tires of various sizes and makes may be readily mounted and secured, by means held upon the rim in a two-fold manner, which means are inseparable from the rim proper while the tire is inflated, but readily removable when the tire is deflated and the bead edge thereof disengaged from the securing or retaining means.

While I have shown and described certain embodiments of my invention it is to be understood that various changes and modifications may be resorted to without departing from the spirit thereof.

What I claim is:

1. The combination with a vehicle wheel rim having an upstanding edge flange and adapted for use with pneumatic tires, of tire-retaining means removably mounted upon the rim and comprising a right angled portion free from contact with the rim and adapted to engage the sides and heel portion of a tire bead to support the tire, and a second portion spaced from the first portion and adapted to seat against the upstanding flange to retain said means upon the rim.

2. A vehicle wheel rim for use with pneumatic tires, said rim including a tire supporting annulus provided with a channeled edge portion terminating in an upstanding circumferential flange that is inwardly inclined relative to the tire supporting surface of the annulus, and a split tire retaining ring removably mounted upon the rim and comprising spaced outer and inner walls, the outer wall being adapted to be disposed within the channel and to bear laterally against the upstanding flange and the inner wall being adapted for engagement with the side of the tire and provided with a portion adapted to extend beneath the bead of the tire whereby the tire is supported upon the ring and the ring locked against removal from the rim the radially inner portions of said walls being unconnected and only one of said walls being adapted to bear radially upon the annulus.

3. A vehicle wheel rim for use with pneumatic tires, said rim including a tire supporting annulus having a channeled edge portion terminating in an upstanding circumferential flange, and a split tire retaining ring removably mounted upon the rim and comprising spaced outer and inner walls the outer wall having a vertical portion adapted to seat at its inner edge within the channel against the upstanding flange and the inner wall having a curved portion engaging the side of a tire and terminating in a lateral ledge adapted to support the bead of a tire, the inner wall and the ledge of the ring being free from contact with the rim.

4. A vehicle wheel rim for pneumatic tires, said rim including a tire supporting annulus having a channeled edge portion terminating in an upstanding circumferential flange and having an annular shoulder adjacent said flange, and a split tire retaining ring removably mounted upon the rim, said ring comprising an outer vertical wall adapted to seat upon the shoulder and an inner curved wall adapted for engagement with the side portion of the tire and provided with a laterally extending ledge projecting beneath the heel of the tire bead, the inner wall and the ledge of the ring being free from contact with the rim.

5. A transversely split tire retaining ring, comprising angularly disposed annular flanges adapted to engage the side and base portions of a tire bead, a vertical flange for engaging the rim of a wheel, an intermediate transversely arched connecting web, and spacing elements between one of the first flanges and the vertical flange.

6. The combination with a vehicle wheel rim having an upstanding edge flange and adapted for use with pneumatic tires, of tire retaining means removably mounted upon the rim having a right angled portion spaced from the rim and adapted to engage the side and heel portion of the tire bead to support the tire and including a second portion adapted to seat against the upstanding flange to retain said means upon the rim.

7. A vehicle wheel rim for pneumatic tires including an annular tire supporting element having a channeled edge portion terminating in an upstanding flange disposed below the face of the element and adapted to form at its juncture therewith an annular shoulder within the channel, and a removable tire retaining element provided with relatively angularly disposed faces for independently supporting the heel of the tire bead, said second element having an edge flange adapted to seat within the channel upon the shoulder.

8. A vehicle wheel rim for pneumatic tires including an annular tire supporting element having a channeled edge portion terminating in an upstanding flange disposed below the face of the element and adapted to form an annular shoulder within the channel at the base of said upstanding flange, and a removable tire retaining element provided with relatively angularly disposed faces adapted to receive the heel portion of the bead element, said tire-retaining element having an edge flange adapted to seat within the channel upon the shoulder, said tire retaining element and said channel being adapted to define a substantial cavity therebetween.

9. A wheel rim for use with resilient tires comprising a rim base having an annular channel formed in one of its marginal portions, the outer wall of said channel being laterally offset from the tire supporting surface of the rim base and having an inwardly extending shoulder, said channel being adapted to receive the heads of a series of spokes, and a removable tire-retaining ring having a tire-retaining flange and a bead-supporting lip formed on said ring, a part of said ring being adapted to seat on the inwardly extending shoulder and to engage the inner face of said outer wall, said bead-supporting lip being adapted to support the bead of the tire independently of said rim base and being spaced from the bottom and inner shoulder of said channel.

In witness whereof, I have hereunto signed my name in the presence of two subscribing witnesses.

BURGESS DARROW.

Witnesses:
PHILIP E. BARNES,
WM. C. MCCOY.